United States Patent [19]

Seymour

[11] 4,300,935
[45] * Nov. 17, 1981

[54] SHAPING GLASS SHEETS BY DROP FORMING WITH IMPROVED SAG CONTROL

[75] Inventor: Samuel L. Seymour, Oakmont, Pa.

[73] Assignee: PPG Industries, Inc., Pittsburgh, Pa.

[*] Notice: The portion of the term of this patent subsequent to Oct. 14, 1997, has been disclaimed.

[21] Appl. No.: 128,335

[22] Filed: Mar. 7, 1980

Related U.S. Application Data

[63] Continuation-in-part of Ser. No. 44,442, Jun. 1, 1979, Pat. No. 4,227,908, which is a continuation-in-part of Ser. No. 960,404, Nov. 13, 1978, abandoned.

[51] Int. Cl.³ .................................. C03B 23/025
[52] U.S. Cl. ........................ 65/107; 65/104; 65/273; 65/287; 65/291
[58] Field of Search ............ 65/107, 104, 268, 273, 65/287, 291

[56] References Cited

U.S. PATENT DOCUMENTS

| | | | |
|---|---|---|---|
| 3,148,968 | 9/1964 | Cypher et al. | 65/106 |
| 3,223,501 | 12/1965 | Fredley et al. | 65/25 A |
| 3,332,759 | 7/1967 | McMaster et al. | 65/25 A |
| 3,468,645 | 9/1969 | McMaster et al. | 65/25 A |
| 3,476,540 | 11/1969 | Ritter et al. | 65/107 |
| 3,507,639 | 4/1970 | Seymour | 65/104 |
| 3,573,889 | 8/1971 | McMaster et al. | 65/268 |
| 3,600,150 | 8/1971 | Rougeux | 65/268 |
| 3,607,187 | 9/1971 | McMaster | 65/106 |
| 3,676,098 | 7/1972 | Hall | 65/106 |
| 3,690,856 | 9/1972 | Bryan | 65/287 |
| 3,701,643 | 10/1972 | Frank | 65/62 |
| 3,713,799 | 7/1973 | McMaster | 65/273 |
| 3,846,104 | 11/1974 | Seymour | 65/104 |
| 3,869,271 | 3/1975 | Shaffer et al. | 65/273 |
| 3,973,943 | 8/1976 | Seymour | 65/348 |
| 4,092,141 | 5/1978 | Frank et al. | 65/114 |
| 4,202,681 | 5/1980 | McMaster et al. | 65/104 |
| 4,227,908 | 10/1980 | Seymour | 65/107 X |

Primary Examiner—Arthur D. Kellogg
Attorney, Agent, or Firm—Donald Carl Lepiane; Edward I. Mates

[57] ABSTRACT

When glass sheets are shaped by drop forming a glass sheet released from vacuum engagement against the bottom perforated plate of a vacuum platen to drop onto a shaping mold of ring-like construction, the intermediate portion of the glass sheet can develop excessive downward sag. The present invention discloses different techniques to develop an upward bow in the intermediate portion of the glass sheet sufficient to compensate approximately for the undesired excessive downward sag.

7 Claims, 18 Drawing Figures

SHAPING GLASS SHEETS BY DROP FORMING WITH IMPROVED SAG CONTROL

CROSS-REFERENCE TO RELATED APPLICATIONS

This application is a continuation-in-part of U.S. Application Ser. No. 44,442, filed June 1, 1979 now U.S. Pat. No. 4,227,908, which, in turn, is a continuation-in-part of abandoned U.S. Application Ser. No. 960,404, filed Nov. 13, 1978.

BACKGROUND OF THE INVENTION

This invention relates to the bending of sheets of thermoplastic material, especially glass. Many techniques for bending glass sheets are known. Perhaps the simplest technique is to heat a glass sheet while supported on a contoured mold and to permit the glass sheet to sag into conformity with the mold. However, it is often desirable to speed the process by applying a mechanical bending force such as by pressing the glass between a pair of contoured molds.

A particularly advantageous press bending process is shown in U.S. Pat. No. 3,846,104 to S. L. Seymour wherein a horizontally oriented glass sheet is heated and lifted by a lower bending mold into contact with an upper bending mold where it is retained by vacuum while the lower bending mold retracts. Then a tempering ring receives the bent glass sheet and conveys it from the bending station into a tempering station. That arrangement is especially advantageous in that it provides contoured support for the bent glass sheet during the tempering step and frees the bending station for initiating the next bending cycle while tempering of the first glass sheet is being carried out. A drawback to such an arrangement is that three major components of the apparatus, the upper and lower forming molds and the tempering ring, must all be custom fabricated for each different shape produced on such a bending and tempering line. It would be desirable not only to reduce the cost of fabricating these elements with each shape change, but also to reduce the down time of the bending and tempering line necessitated by the installation of these elements with each product change.

In U.S. Pat. No. 3,713,799 to H. A. McMaster, a similar arrangement is disclosed, but in which the lower shaping mold serves to carry the bent glass sheet into the tempering station, thus delaying the commencement of the next bending cycle until the lower bending ring deposits the glass sheet in the tempering station and returns to the bending station. Likewise, in this arrangement a product change requires a major retooling of the bending station since the upper and lower forming molds as well as the gas support block into which the lower forming mold recesses, all must conform to the shape of the glass sheets being processed. A similar arrangement in U.S. Pat. No. 3,573,889 to H. A. McMaster et al. has the same drawback.

U.S. Pat. Nos. 3,507,639 to S. L. Seymour and 3,676,098 to H. R. Hall both show horizontal press bending arrangements wherein only two elements, the upper and lower bending molds, need to be custom fabricated for each glass shape being produced. It would be desirable to reduce the number of custom made parts even further. Furthermore, in both of these arrangements the edges of the bent glass sheets are not supported as they are conveyed from the bending station into the tempering station.

U.S. Pat. No. 3,476,540 to Ritter et al. discloses a glass bending arrangement whereby the inertia of a single vertically rising lower bending mold effects the bending. Disadvantageously, the bent glass sheets must pass without edge support along a roller conveyor into the tempering zone.

U.S. Pat. No. 3,600,150 to Rougeux shows a glass bending arrangement wherein a heat-softened glass sheet is slipped from a roller conveyor onto a flexible hammock and thereafter press bent between upper and lower forming molds. The purpose of the flexible hammock is to support the glass sheet initially out of contact with the rigid shaping mold surfaces. It is apparent that a major reconstruction of the apparatus would be required when a change in the glass shape is desired.

While the drop forming method and apparatus disclosed in the parent application Ser. No. 960,404 overcome many of the problems mentioned above, additional versatility in shaping glass sheets with such a process to a wider variety of shapes, especially relatively deep bends, would be highly desirable. One difficulty encountered in the drop forming process is that when shapes having a relatively deep bend in one direction are made, the glass is sometimes over-bent in the transverse direction. The present invention is an improvement in the drop forming process which helps overcome this problem.

SUMMARY OF THE INVENTION

In the drop forming method of shaping glass sheets a single shaping mold conforming to the outline and contour of the bent glass sheet is employed, onto which a heat-softened glass sheet is dropped to impart the bending force to the glass. Immediately after each glass sheet leaves a heating furnace, it is elevated by means of a vacuum platen which is brought into contact with the upper side of the glass sheet. When the vacuum platen and the glass sheet are raised to an elevated position, the shaping mold is conveyed into a position beneath the glass sheet, the vacuum is released, and the glass sheet drops onto the shaping mold to effect the bending. The shaping mold is then retracted from beneath the vacuum platen and passed into a tempering station where blasts of air are directed onto the opposite surfaces of the glass sheet to temper the glass. This arrangement greatly simplifies change-over from one shape to another since the single bending mold is the only major element which must be reconstructed. Another important feature of the drop-forming process is that the arrangement may be readily adapted to bending and tempering a plurality of glass sheets simultaneously, thereby greatly increasing the productivity of the installation.

In the present invention, the glass-contacting face of the vacuum platen has means to impart a temporary reverse bow to a glass sheet before being dropped to be shaped. The reverse bowing means may comprise a ring or partial ring member aligned with marginal portions of the glass sheet or may comprise a shaping surface of slightly domed configuration. When the glass sheet is drawn toward the platen by vacuum, the center portion of the glass sheet bows upward relative to the rest of the glass sheet, which is the reverse of the curvature subsequently imparted to the glass when it is dropped onto the shaping mold. Thus, the reverse bow initially imparted to the glass sheet serves to lessen the depth of the final curvature after the glass sheet has been dropped. Hence, the present invention provides improved sag control in a glass sheet shaped by a process that incorporates a drop forming step.

The Drawings

DETAILED DESCRIPTION

Figure 1:
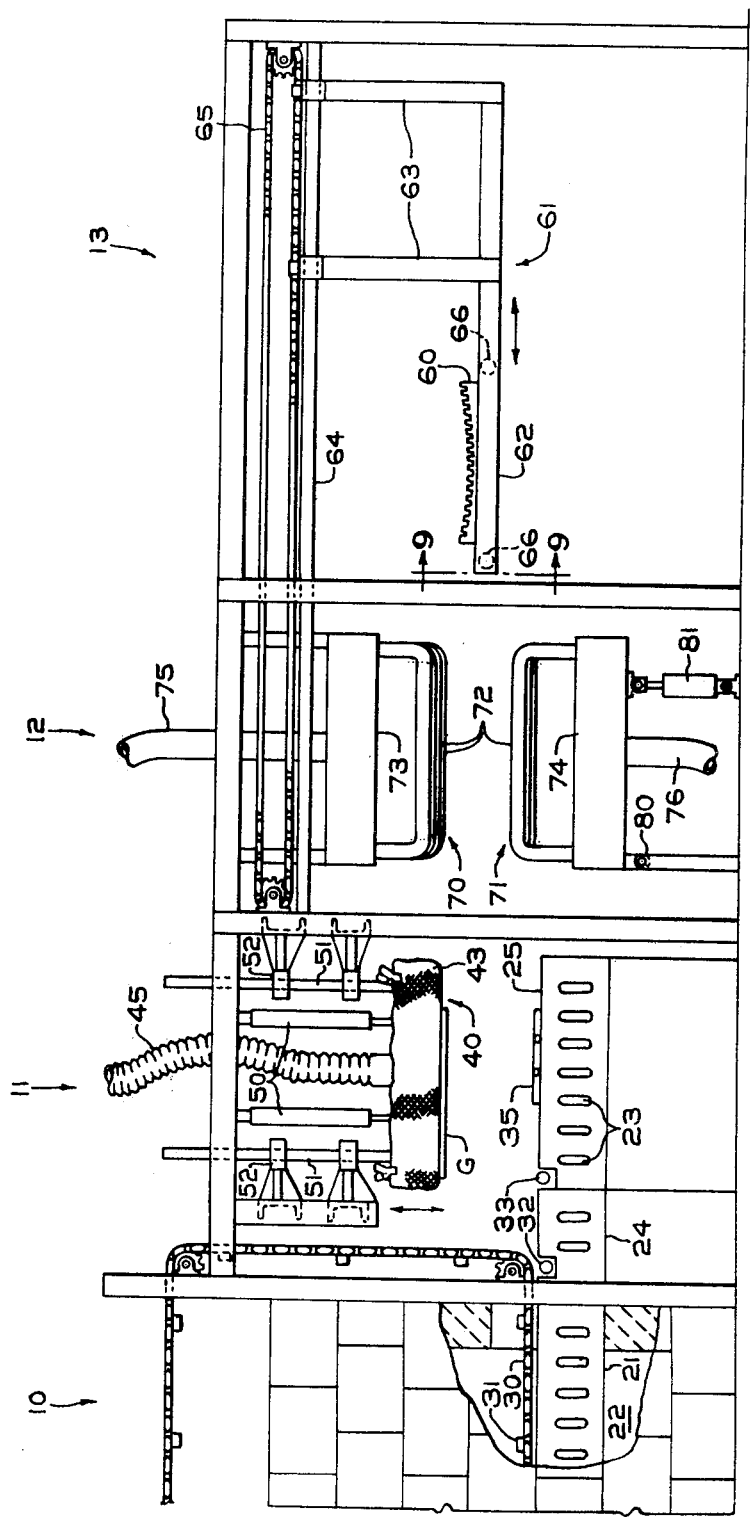
FIG. 1 is a side view of a specific preferred embodiment of a glass sheet bending and tempering installation incorporating the drop forming process and a flat vacuum pick-up.

In FIG. 1 there is shown a bending and tempering line including a furnace 10 (only the exit end of which is shown), a bending station 11, a tempering station 12, and an unloading station 13. The furnace, tempering station, and unloading station form no part of the present invention, and the description of a specific embodiment herein is for the purpose of illustration only. Any arrangement known in the art for heating and tempering a series of horizontally disposed glass sheets may be employed in connection with the bending process of the present invention. Accordingly, only a brief description of the furnace, tempering station and unloading station will be set forth here. Additional details regarding these aspects of the overall bending and tempering line may be obtained from U.S. Pat. No. 3,846,104 (Seymour), the disclosure of which is hereby incorporated by reference.

Furnace 10 is preferably of the gas support type wherein the sheets of glass are supported on a layer of hot gases as they are heated and conveyed through the furnace. Examples of gas support furnaces for heating glass sheets may be found in U.S. Pat. No. 3,223,501 to Fredley et al. and in U.S. Pat. No. 3,332,759 to McMaster et al. In the cut-away portion of the furnace in FIG. 1 it can be seen that the gas support bed is defined by a hearth block 21 through which a large number of vertical bores extend, some of which communicate the upper surface of the hearth block with hot, pressurized gases from a plenum chamber 22 and others of which communicate the top surface of the hearth block with cross-bored exhaust passages 23. The same hearth block construction continues beyond the furnace exit to an extension 24 and a support block 25 in the bending zone. Greater detail of the hearth block construction may be found in the cross-sectional view of support block 25 in FIG. 3. There, it can be seen that vertical bores 26 extend completely through the block and that bores 27 extend from the surface to the horizontally extending exhaust passages 23.

Referring again now to FIG. 1, there is shown one typical arrangement for propelling the glass sheets through the furnace as they are supported on a film of hot gases. The conveying mechanism there comprises a pair of parallel, endless chains 30 flanking the path of the glass sheets inside the furnace and joined by a plurality of pusher bars 31. At the exit of the furnace, each glass sheet may be released from the chain conveying means and driven at an accelerated speed across the extension block 24 and into the bending station by means of a take-out roll 32 and an aligning roll 33. Passage of the glass sheets from the furnace may be aided by providing the hearth blocks 21, 24, and 25 with a slight downward slope (e.g., 1 degree to 2 degrees). Typically, sufficient gas pressure is maintained between the hearth blocks and the glass sheets so as to float the glass sheets about 1/16 inch (1.6 millimeters) above the upper surface of the hearth blocks. Take-out roll 32 and aligning roll 33 project above the upper surface of the hearth blocks just enough to make contact with the undersides of the glass sheets.

Figure 2:
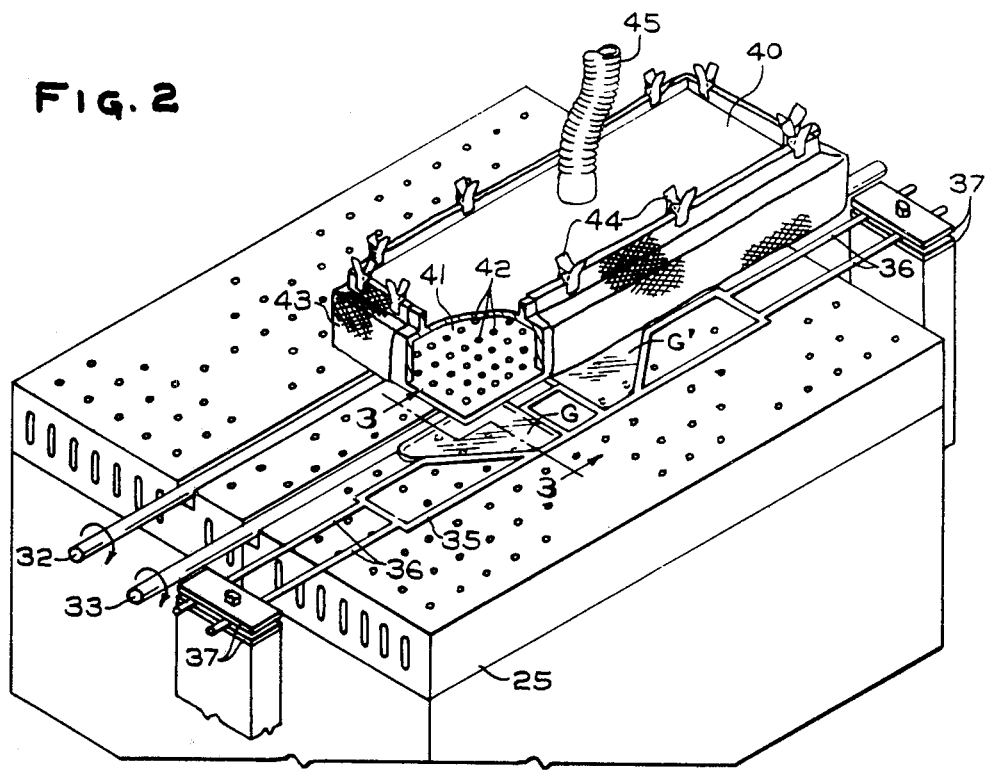
FIG. 2 is a perspective view of the drop forming section of the bending and tempering apparatus of FIG. 1.

When a glass sheet has arrived in the bending station, its forward progress is stopped by a locator frame 35 resting on hearth block 25. The locator frame defines at least one open-ended "pocket" within which the forward portion of a glass sheet may be received. As shown in FIG. 2, the locator frame 35 includes two such pockets for receiving glass sheets G and G'. Each of the glass sheet receiving pockets is contoured to correspond approximately to the outline of the leading portion of each glass sheet so that the glass sheet, when urged into engagement with the locator frame, will become seated firmly within the pocket with little or no freedom of movement.

Figure 3:
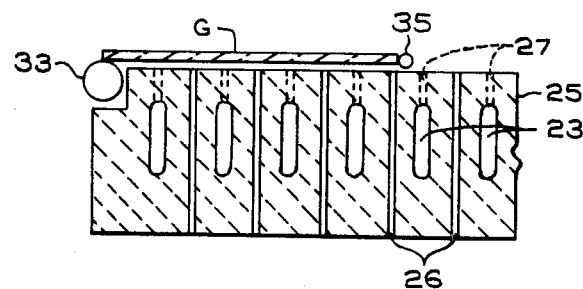
FIG. 3 is a cross-sectional view through the gas support block in the forming zone taken along line 3—3 in FIG. 2.

The locator frame 35 is spaced from aligning roll 33 a precisely determined distance so that the trailing edge of a properly aligned glass sheet is approximately directly over the center of the aligning roll 33 as shown in FIG. 3. The aligning roll 33 continues rotating so as to urge the glass sheet into the pocket of the aligning frame as the glass sheet floats on the layer of hot gases. The frictional force between the aligning roll 33 and the glass sheet is minimized and restricted to the trailing edge of the glass sheet in order to avoid scuffing the glass, but is sufficient to drive the floating glass sheet into an equilibrium position in alignment with the pocket of the locator frame and to retain the glass sheet therein.

Such an aligning arrangement readily lends itself to processing a plurality of glass sheets side by side. For example, the locator frame in FIG. 2 is constructed to receive two glass sheets and in FIG. 10 a locator frame is shown for receiving four glass sheets. It should be apparent that a locator frame could be adapted to accommodate any number of glass sheets which will fit side-by-side on the hearth block 25.

The locator frame 35 may be held in place by means of rods 36 which, as shown in FIG. 2, may extend laterally toward support means on each side of the hearth block 25. The rods 36 are preferably supported at their ends with some provision for adjustability, such as by clamping between a pair of plates 37 as shown. Other arrangements for mounting the locator frame will be described later in connection with FIGS. 10 and 11. The locator frame arrangement itself is the subject matter of co-pending patent application Ser. No. 960,403 filed on Nov. 13, 1978, by S. L. Seymour and entitled "Glass Sheet Alignment Means and Method," the disclosure of which is incorporated by reference.

While the use of a locator frame and an aligning roll as described above is the preferred arrangement for repetitively establishing a precisely predetermined location for each glass sheet as it enters the bending station, other arrangements may serve the same purpose. For example, the use of vertically retractable pins as shown in U.S. Pat. Nos. 3,573,889 and 3,676,098 may be resorted to.

It may also be noted that in the event that a roller conveyor were to be used instead of a gas support bed, the need to precisely align the glass sheets within the bending staion may be less critical. This is because glass sheets are more prone to drift out of alignment when floating freely on gas support. When a roller conveyor is used to convey the glass sheets into the bending station, final orientation of the glass sheets may be carried upstream from the bending station as shown in U.S. Pat. No. 3,701,643 to R. G. Frank, for example.

Directly overlying the locator frame 35 is vacuum platen 40. The vacuum platen is comprised of a hollow chamber having a flat bottom plate 41 through which a large number of perforations 42 extend.

In order to protect the surface of the hot glass sheets, the underside of the vacuum platen may be covered with a protective cover 43, which may be a stretchable knit fiber glass fabric as disclosed in U.S. Pat. No. 3,148,968 to J. H. Cypher et al. The cover 43 may be held in place by a plurality of clamps 44.

The hollow interior of the vacuum platen communicates with a source of vacuum by means of a flexible conduit 45. The area of the vacuum platen should exceed the total area of the largest glass sheet or sheets to be received at one time in the locator frame 35. For the greatest versatility the vacuum platen may cover substantially the entire area of hearth block 25.

The flatness and rigidity of the bottom plate 41 of the vacuum platen were considered to be important factors for the successful practice of the drop-forming process. Any significant deviation from flatness can result in distortion being imparted to the glass sheets. Thus, the bottom plate 41 was fabricated with careful attention to providing a flat bottom surface and was sufficiently rigid to avoid any bending or warping during use. Preferably, the bottom plate is a relatively thick, single piece of heat-resistant metal, such as stainless steel, although in some cases it may be possible to use thinner stock material with reinforcement members welded to the interior surface. As an example of the preferred one-piece construction, a stainless steel thickness of at least one-half inch (13 millimeters), preferably at least ⅝ inch (16 millimeters), has been found suitable for a plate 32 inches by 78 inches (81 centimeters by 2 meters). In that example, the interior of the vacuum platen was 3 inches (7.5 centimeters) tall.

The vacuum platen is provided with means for vertical reciprocation, such as hydraulic cylinders 50 and guide rods 51, as shown in FIG. 1. The guide rods 51 may slide in fixed, annular sleeves 52. The cylinders 50 reciprocate the vacuum platen between a raised position, as shown in FIG. 1, and a lowered position in which the platen is brought closely adjacent to, or in contact with, the locator frame 35 and the glass sheet or sheets held by the locator frame. When the vacuum platen is in the lowered position, sufficient vacuum is applied to draw the glass sheets into contact with the platen and to be lifted by the vacuum platen as the vacuum platen is raised. The platen need not come into contact with the glass sheets in order to pick them up. Merely approaching within 1/32 inch (0.8 millimeter) to about 1/16 inch (1.6 millimeters) has been found sufficient to lift the glass sheets, although this may vary depending upon the amount of vacuum applied and the weight of the glass.

Additionally, the amount of vacuum required, the number of perforations 42 in the vacuum platen, and the diameter of the perforations are interdependent. It is desirable to keep the perforations 42 small in number and diameter so as to minimize the power requirement for maintaining a vacuum in the vacuum platen, but there should be enough perforations so that a relatively uniform distribution of the perforations will overlie each portion of the smallest piece of glass to be processed. A spacing of about one perforation per square inch (6.5 square centimeters) has been found to be suitable for most purposes. Perforation diameters larger than 0.075 inch (1.9 millimeters), for example about 0.090 inch (2.3 millimeters), have been found satisfactory with a vacuum of 4 inches (10 centimeters) water (gauge). These data pertain to the processing of 3 millimeter thick sheets of soda-lime-silica float glass of standard commercial composition.

With the glass sheet or sheets drawn against its underside by vacuum, the platen 40 is raised to the elevated position as shown in FIG. 1 so as to leave sufficient clearance to insert an outline shaping mold 60 between the hearth block 25 and the platen. The shaping mold conforms to the outline and contour desired for the bent glass sheets and is preferably constructed in accordance with the disclosure of U.S. Pat. No. 3,973,943 to S. L. Seymour, the disclosure of which is hereby incorporated by reference. The shaping mold is preferably of the outline ring type, light in weight and notched along its upper edge in order to provide minimal interference with the flow of air during tempering.

Figure 9:
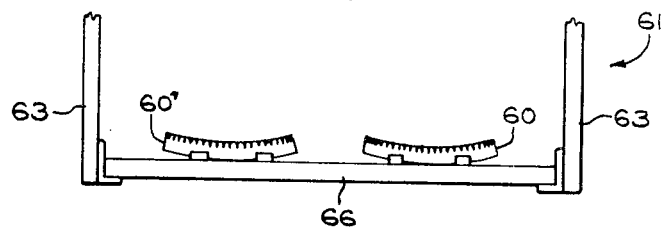
FIG. 9 is an end view of the bending mold and support structure taken along line 9—9 of FIG. 1.

The shaping mold is carried on a shuttle 61 by which the shaping mold is translated horizontally through the bending, tempering and unloading zones. In the specific embodiment illustrated, the shuttle consists of a pair of cantilevered beams 62 supported at one end by vertical braces 63, the upper ends of which are adapted to slide along a pair of horizontal guide rods 64. The means for driving the shuttle 61 along the horizontal path may be provided by way of an electric motor (not shown) driving a continuous chain 65 to which the upper ends of braces 63 are affixed. Cross-braces 66 may support the shaping mold or molds on the shuttle. An end view of the shuttle may be seen in FIG. 9, wherein two shaping molds 60 and 60' are included for simultaneously receiving sheets G and G' in FIG. 2.

When the vacuum platen 40 has been raised to a height above the elevation of the shaping mold 60, the shuttle is driven to the left as viewed in FIG. 1 so as to bring the bending mold into direct alignment beneath the sheet of glass elevated on the vacuum platen. Typically, the distance between the vacuum platen and the hearth block 25 at this point may be about 6 to 8 inches (15 to 20 centimeters). This distance will have an effect on the rate at which the glass sheet loses heat, since a higher elevation raises the glass sheet into a cooler environment. This effect may be used to "fine tune" the temperature (and thus the viscosity) at the moment the glass sheet is dropped onto the shaping mold.

The uppermost extent of the shaping mold when in position directly beneath the glass sheet is spaced from the glass sheet a distance greater than the minimum required to clear the glass sheet, so that when the glass sheet is released from the vacuum platen it will fall a distance onto the shaping mold sufficient to generate a substantial bending force on the glass upon impact.

In the typical case where the contour of the shaping mold includes points of maximum elevation, the falling glass sheet first contacts these high points, and a bending moment about these points is generated which forces the remainder of the glass sheet to bend downwardly until substantially complete contact is made with the shaping mold. A suitable distance between the vacuum platen and the high points of the shaping mold has been found to be about 1 to 2 inches (2.5 to 5 centimeters), and about 2 to 6 inches (5 to 15 centimeters) at the low points of the mold. The precise distance through which the glass falls will depend upon the weight and temperature of the glass, the degree of curvature to be imparted to the glass, and the geometry of the particular shape and in unusual cases may vary beyond the distance ranges given above.

Release of the glass sheet from the vacuum platen is carried out by reducing the vacuum to an amount insufficient to support the glass sheet. This may be accomplished conveniently by opening a valve to bring the interior of the vacuum platen into communication with atmospheric pressure. Or in some cases, it may be desirable to expedite the release of the glass from the platen by following a rapid decay of the vacuum with a rapid buildup to a positive pressure.

Another optional feature is to provide the vacuum platen with a plurality of separately controllable vacuum zones so that the vacuum may be released nonuniformly. For example, it may be beneficial in some cases to release the edge portions and the center portion of a glass sheet at different times. By delaying the release of the center portions a slight reverse bend may be imparted to the glass, which may be helpful in avoiding excessive center sag when the glass sheet is dropped onto a concavely contoured shaping mold. Conversely, differential vacuum release may be utilized to accentuate a relatively deep bend which may be otherwise difficult to attain by impact force alone.

The momentum imparted to the glass sheet by its free fall onto the shaping mold preferably provides essentially the sole bending force for conforming the glass sheet to the contour of the shaping mold. Although some minor amount of sagging due to the force of gravity may take place after the glass sheet has come to rest on the shaping mold, its magnitude is insignificant relative to the bending produced by the momentum-generated force in the preferred mode of operation. Sagging is a relatively slow process, and in the present invention, tempering is preferably initiated in the minimum amount of time, thereby providing insufficient time for a significant amount of gravity-induced sagging to take place.

On the other hand, for some difficult bends it may be desirable to delay the start of tempering so as to permit a significant amount of additional sagging to take place after the glass sheet has dropped onto the mold. Although slower than the preferred mode, such a technique would be considerably faster than gravity sagging alone since the initial dropping of the glass onto the mold would accomplish a substantial part of the bending very quickly.

Upon receiving the glass sheet, the shaping mold is immediately transferred out of the bending station into the tempering station 12. The tempering station includes upper and lower blast heads 70 and 71 which direct blasts of tempering medium (usually air) onto opposite sides of the glass sheet so as to rapidly cool surface portions of each sheet, thereby imparting a temper to the glass sheet.

In the type of tempering station shown in FIG. 1, each blast head includes a plurality of pipe modules 72 in fluid communication at their ends with a manifold 73 or 74. Each manifold, in turn, is supplied with pressurized tempering fluid through ducts 75 and 76. Each of the pipe modules 72 has a plurality of small orifices oriented so as to direct jets of tempering fluid toward the position occupied by glass sheets conveyed into the space between the upper and lower blast heads 70 and 71. The pipe modules 72 may be provided with adjustability in the vertical direction with respect to the manifolds 73 and 74 so that more uniform spacing between the glass surfaces and the pipe modules may be provided. The lower blast head 71 may be provided with hinged support 80 at one end and cylinder means 81 at the opposite end so as to permit the lower quench module to be tilted when the need arises to clear glass fragments from the blast head.

While blasts of tempering medium are being directed onto the glass sheets in the tempering station, it is preferred to provide relative motion between the blast heads and the glass sheets. This may be carried out by horizontally reciprocating the shuttle means 61 on which the shaping mold and glass sheets are carried.

When tempering has been completed, the shuttle means 61 advances to the full right-hand position as shown in FIG. 1 to bring the glass sheet or sheets into the unloading station 13. There, the glass sheets may be removed from the shaping mold by hand or by suitable mechanical means.

Figure 4:
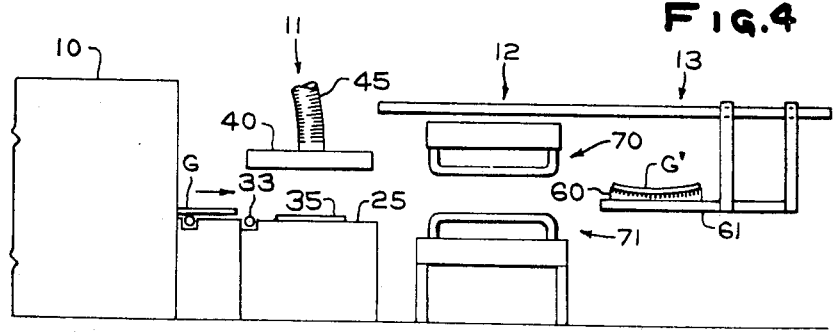
FIGS. 4 through 8 illustrate sequential steps in a cycle of operation of the apparatus of FIG. 1.

FIGS. 4 through 8 illustrate one cycle of operation in the method of bending glass sheets in accordance with the present invention. In FIG. 4, a sheet of glass G is emerging from the furnace 10. At the same time, an already bent and tempered sheet of glass G' is about to be unloaded from the shuttle 61.

Figure 5:
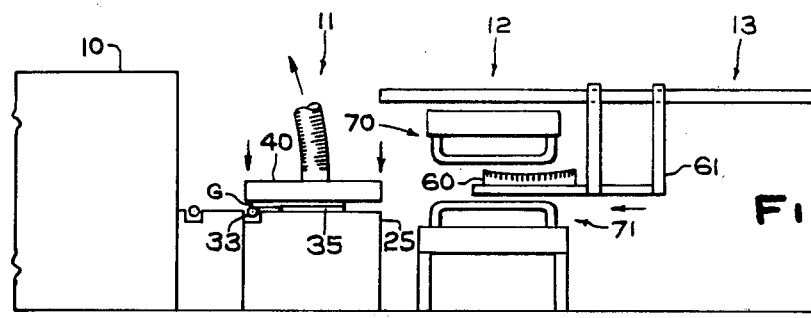

In FIG. 5, the sheet of glass G has entered the bending station 11 and its front end has engaged the locator frame 35 while being driven at its railing edge by aligning roll 33. At the same time, vacuum platen 40 is being lowered to engage the glass sheet. The previous glass sheet has been unloaded from the shuttle 61 and the shuttle has begun to move toward the bending zone.

Figure 6:
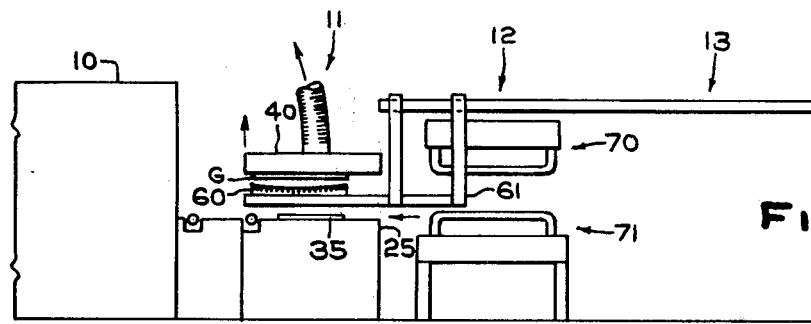
Figure 7:
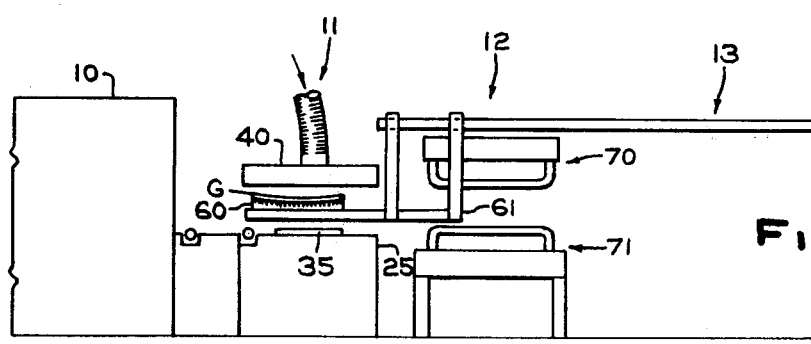

In FIG. 6, the sheet of glass has been lifted from the gas support bed 25 by the vacuum platen 40 and shuttle 61 has come to rest, with the shaping mold 60 directly beneath the glass sheet. In FIG. 7, the vacuum has been released from the vacuum platen and the sheet of glass has fallen onto the shaping mold 60 and has thereby become bent to the desired curvature.

Figure 8:
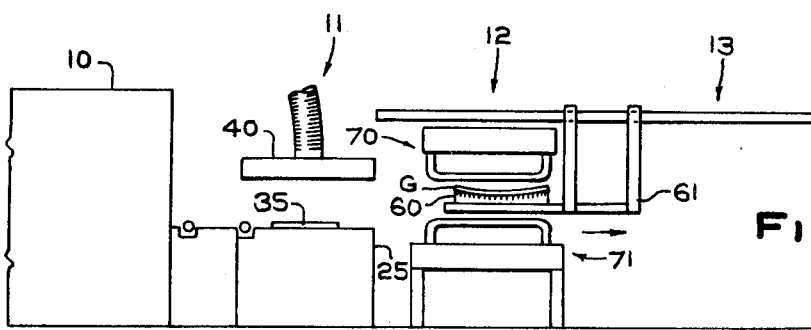

The shuttle immediately carries the glass sheet out of the bending station and into the tempering station 12 where it is rapidly cooled by blasts of air as show in FIG. 8. Thereafter, the shuttle carries the glass sheet into the unloading station 13.

The following operating parameters are an example of a successful operation of the above-described preferred embodiment of the invention with glass sheets 3 millimeters thick. Under different conditions the data will vary.

The furnace atmosphere was maintained at a temperature of about 1300° F. (700° C.). The gas issuing from the hearth block 25 in the bending zone may be about 1100° to 1350° F. (600° to 725° C.), typically about 1250° F. (675° C.). The vacuum platen 40 attained a temperature of about 500° to 700° F. (260° to 400° C.) after a period of operation due to its proximity to the hot gases from hearth block 25. The glass was typically at about 1210° F. (650° C.) when picked up by the vacuum platen. A total of about 6 seconds elapsed from the time of glass pick-up until the initiation of tempering, at which time the glass had cooled to about 1190° F. (640° C.). About 3 seconds elapsed from the time the glass was dropped onto the shaping mold until tempering was initiated. Altogether about 10 seconds was required for the glass to pass from the furnace exit, undergo bending, and enter the tempering station. These rapid bending rates not only indicate a high rate of throughput, but are also advantageous for the sake of attaining high degrees of temper since the rapidity of the bending process permits tempering to begin before the glass sheets have lost an appreciable amount of heat.

Figure 10:
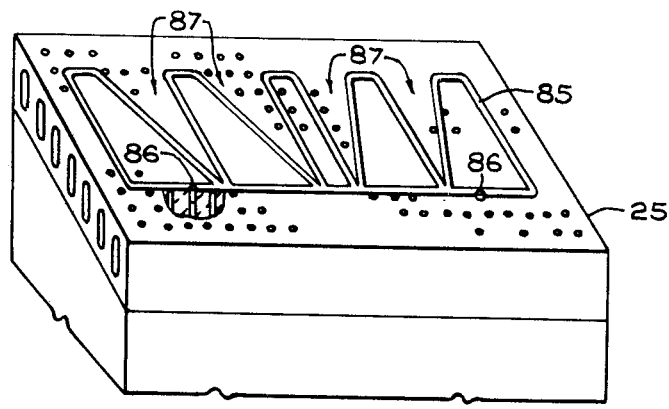
FIG. 10 is a perspective view of the gas support bed in the shaping station showing the quadruple aligning frame and an alternate mounting arrangement for the aligning frame.

FIG. 10 shows an alternate arrangement for mounting a locator frame onto the hearth block 25 in the bending station. In order to illustrate the versatility of the locator frame arrangement, a locator frame 85 is depicted in FIG. 10 which is provided with four pockets 87 permitting the simultaneous alignment and bending of four sheets of glass. For retaining the locator frame in place, two or more pins 86 are welded to the front edge of the locator frame and may be inserted into holes bored into the hearth block 25. The holes may be those already present in the hearth block for the passage of gases, or special holes may be drilled for the purpose of receiving the pins 86.

Figure 11:
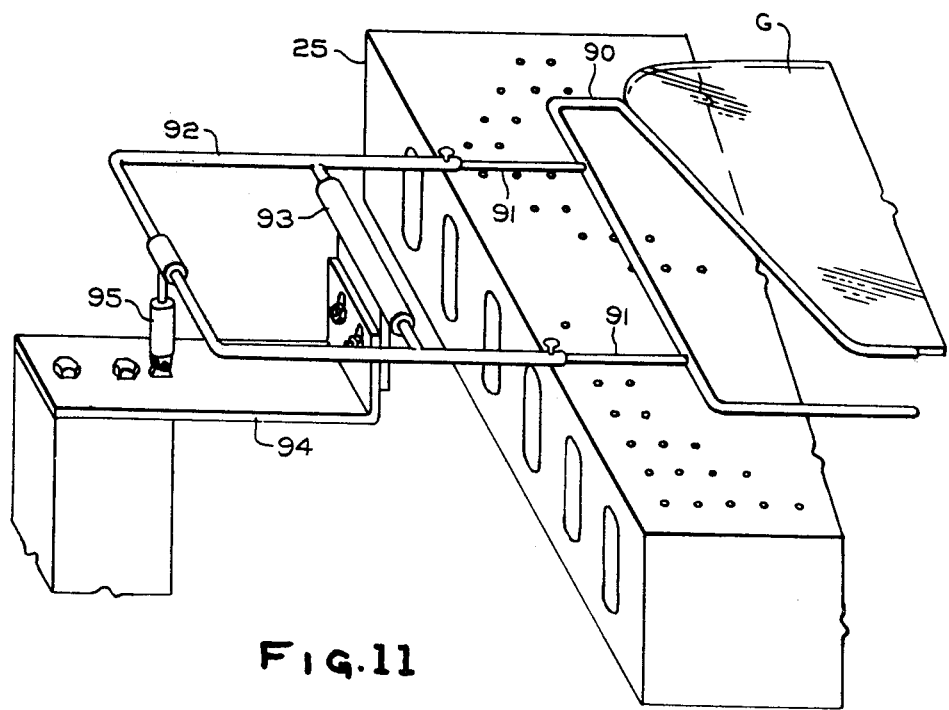
FIG. 11 is a perspective view of another alternate mounting arrangement for the aligning frame in the shaping station.

FIG. 11 depicts yet another variation on the mounting arrangement for the locator frame. In this case, the locator frame is provided with pivoting support so that the locator frame may be readily raised above the surface of the hearth block 25 if it should become necessary to remove glass fragments from the hearth block. A pair of rods 91 telescope into the ends of a tubular hinge bracket 92 for lateral adjustability. The hinge bracket 92 pivots through a sleeve 92 which is affixed with vertical adjustability to a support arm 94. The outer end of hinge bracket 92 may be engaged by mechanical actuating means such as a hydraulic cylinder 95 so as to provide remote control of the locator frame lifting mechanism. In the embodiment of FIG. 11, it is preferred that the locator frame consist of two halves, with each half being lifted by its own respective hinge means.

Figure 12:
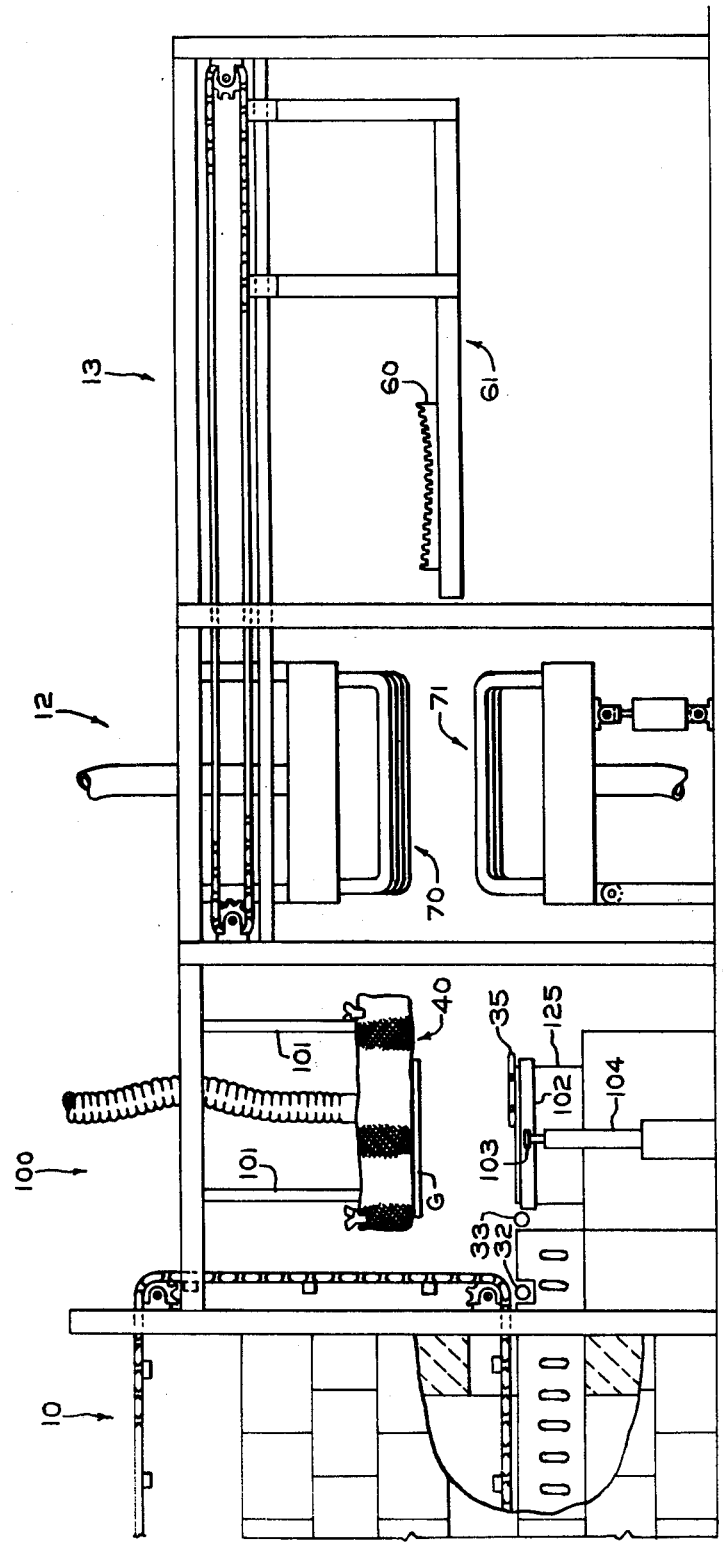
FIG. 12 is a side view of an alternate embodiment for drop forming glass sheets using a flat lifting ring.

FIG. 12 shows an alternate arrangement which incorporates some, but not all, of the features and advantages of the previous embodiment of the present invention. In FIG. 12, like numerals refer to elements which may be identical to those which have been described in connection with the previous embodiment of FIG. 1. In particular, the furnace 10, tempering station 12, and unloading station 13 are identical to those of FIG. 1 and need not be described here. However, in the bending station 100 in FIG. 12, the vacuum platen 40 is not vertically reciprocated but is rigidly suspended by beams 101.

Like the previous embodiment, the vacuum platen is flat and need not be modified when changing glass shapes. But instead of being picked up by the vacuum platen, the glass sheets in this embodiment are lifted into contact with the underside of the vacuum platen by a lifting ring 102.

Lifting ring 102 is vertically reciprocated by means of a hydraulic cylinder 104 which is connected to the ring by means of a laterally extending tab 103. The ring 102 may fit around a gas support hearth block 125 which may be of essentially the same construction as that of previously described hearth block 25, but of reduced size. Alternatively, the ring 102 may fit into grooves cut into the top of a larger size hearth block. The upper side of the lifting ring defines a flat plane of support for a glass sheet along either a continuous or discontinuous line of contact with marginal edge portions of a glass sheet.

Glass sheets are aligned on hearth block 125 by a locator frame 35 and aligning roll 33 in the same manner as previously described. After each glass sheet is lifted by the ring 102 and retained on the underside of the vacuum platen 40, the ring is retracted to its lower position, a shaping mold 60 is brought into alignment beneath each glass sheet, and the glass sheet is dropped onto the shaping mold to impart the desired curvature to the glass sheet. This arrangement is advantageous relative to prior art vacuum assisted bending arrangements in that the vacuum platen is flat and need not be reconstructed when a product change is made, and in that it can be readily adapted to the simultaneous processing of a plurality of glass sheets. However, the FIG. 12 arrangement is not as advantageous as that of the preferred embodiment because the hearth block 125 and the lifting ring 102 must be replaced for each change in the shape or number of glass sheets to be processed.

Other variations on the FIG. 1 embodiment may involve the use of a roller conveyor instead of the gas support means for supporting and conveying the glass sheets. A roller conveyor may be used in place of all of the gas support bed sections in the furnace and bending station, or it may be advantageous to substitute a roller conveyor for the gas support bed in the furnace only and to utilize a gas support hearth block such as 25 in the bending station.

It should also be apparent that the step of aligning the shaping mold with the glass sheet prior to dropping the glass sheet may optionally entail translating the platen rather than the shaping mold.

Another alternative within the scope of the invention is to heat the glass sheets as they are being supported in a generally vertical orientation. For example, the glass sheets may be conveyed through a furnace while resting on their lower edges and being held upright by currents of heated gases, as disclosed in U.S. Pat. No. 3,341,312 to R. W. Wheeler. The vacuum platen may swivel to receive each glass sheet in a vertical orientation and then rotate to a horizontal orientation for dropping the glass sheet onto a shaping mold.

Figure 13:
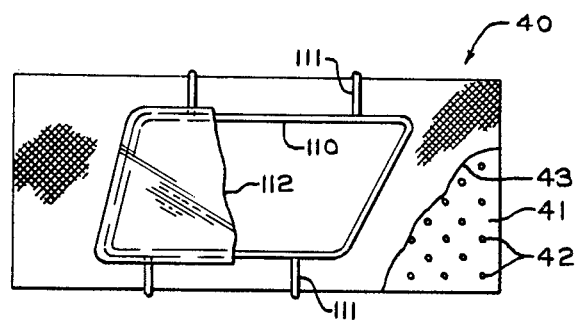
FIG. 13 is a bottom view, partly broken away, of a vacuum platen provided with a reverse bow inducing ring in accordance with the present invention.
Figure 14:
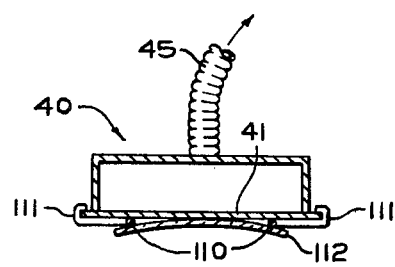
FIG. 14 is a side cross-sectional view of the platen of FIG. 13 showing the reverse bowing effect on a sheet of glass.
Figure 15:
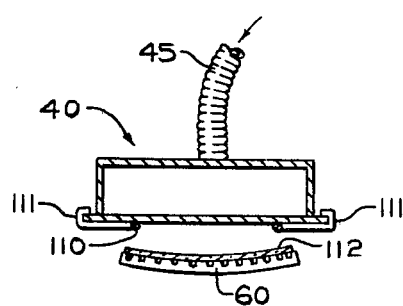
FIG. 15 is a side cross-sectional view of the platen as in FIG. 14, with the glass sheet dropped onto a shaping mold.

An example of the modifications to the drop forming process which are the subject of the present invention is illustrated in FIGS. 13 through 15. The essential feature of the invention is a rigid reverse bow inducing member affixed to the glass-engaging surface of a vacuum platen which will maintain a peripheral portion of a glass sheet spaced from the flat surface of the platen. This member may take a variety of forms, such as a rod or rods, a series of discrete projections, or a template with an opening slightly smaller than the outline of the glass sheet.

In FIG. 13, viewing the underside of vacuum platen 40, which may be otherwise essentially identical to the platen previously described, there may be seen a reverse bow inducing member 110 embodied as a rod bent to a ring corresponding to, but slightly smaller than, the outline of a glass sheet 112 being bent. The ring member 110 may be fastened to the face of the platen by means of metal straps or rods 111, for example. The fasteners 111 may engage any suitable portion of the platen and, as shown in FIG. 14, may engage a flange on the platen if such is available. The ring 110 is shown affixed outside the fiber glass cover 43, but as an alternative, the cover 43 may extend over the reverse bow inducing member, although accelerated wear of the cover would probable be entailed.

In FIG. 14, the cross-sectional view through the platen, ring 110, and glass sheet 112 (viewed from the side) shows the reverse bowing effect that ring 110 has on the glass sheet. It can be seen that when the glass sheet is drawn toward the platen by vacuum the unrestrained center portion of the glass sheet bows toward the platen to a radius of curvature determined by the thickness and location of the projecting ring member 112.

The diameter of the rod from which ring 112 is formed will vary in accordance with the requirements of a particular production run, but as as illustration, a rod diameter on the order of 0.25 inches (6.35 millimeters) may be used in some situations. If the reverse bow inducing member projects too far from the platen, undesirable localized kinking near the edges of the glass may result, provided the viscosity of the glass sheet is sufficiently low and the vacuum force is sufficiently strong.

The ring arrangement for the bow inducing member advantageously causes the vacuum to be trapped in an enclosed space between a glass sheet and the platen, thereby minimizing the vacuum requirements. However, with the provision of adequate vacuum, the bow inducing member may be discontinuous. It may, for example, be open ended to produce a more cylindrical bow, or it may be arranged to engage only a single side or a single end portion of a glass sheet.

When the vacuum is released from the platen, as depicted in FIG. 15, the bowed sheet of glass 112 is dropped onto an outline shaping mold 60, whereupon the upward bow in the glass is reversed, or at least substantially reduced, by the impact of the fall. In the center portions of the glass sheet, a significant portion of the impact focce is expended in reversing the previously induced bow, so that the final curvature is not as deep as if the glass sheet had been flat when dropped.

This effect is particularly useful for producing a relatively deep bend about one axis of curvature while maintaining a relatively moderate curvature about a transverse axis. In such a case, the initial reverse bow is accentuated in one direction so as to counteract the sagging of the glass about the transverse axis. In other words, the reverse bowing may be utilized to impart a final curvature to the glass which is more nearly cylindrical than spherical.

It should be appreciated that the use of a separate bow-inducing member affixed to the face of a flat vacuum platen possesses a considerable advantage over the use of a contoured platen in that a new member may simply be clamped in place upon a product change instead of rebuilding a contoured platen.

While a separate upward bow-inducing member of different outline configuration and/or thickness may be replaced more readily on a permanently installed vacuum platen than replacing one vacuum platen with another vacuum platen, it is not too difficult a task to separate an apertured bottom plate having a downwardly facing, shaping surface of one configuration from the platen and attach another apertured bottom plate having a downwardly facing, shaping surface of a different configuration to the vacuum platen. Under certain circumstances, such as when production changes from sheets of significantly different outline sizes and/or significantly different complex shapes, it could be more practical for long term mass production operations to use replaceable contoured vacuum platens.

Figure 16:
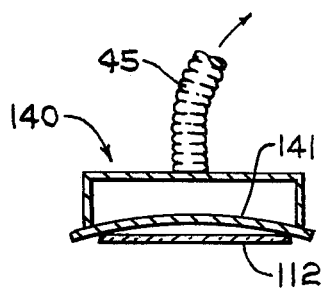
FIG. 16 is a side cross-sectional view of an alternate embodiment showing a replaceable contoured vacuum platen having an upwardly domed configuration making initial engagement with a heat-softened glass sheet.
Figure 17:
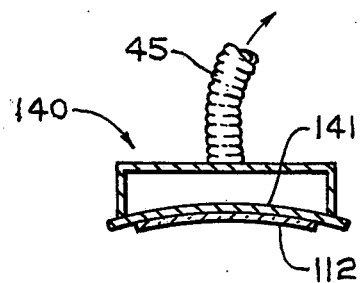
FIG. 17 is a view taken shortly after FIG. 16, showing the heat-softened glass sheet distorted into a domed configuration conforming to the shape of the contoured vacuum platen.
Figure 18:
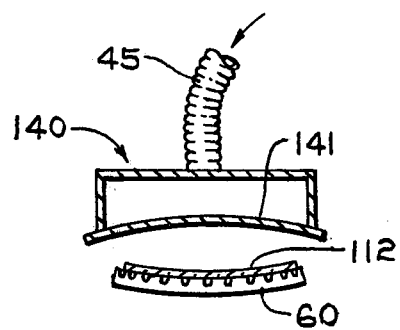
FIG. 18 is a view similar to FIGS. 16 and 17 taken after the contoured vacuum platen has released the glass sheet so that the latter has dropped onto a shaping mold located below said contoured vacuum platen.

FIGS. 16, 17 and 18 are three views of a typical modified vacuum platen 140 provided with a contoured bottom plate 141 conforming to another embodiment of this invention in various stages of a typical drop-forming operation wherein a glass sheet 112 is engaged by vacuum applied through the contoured bottom plate 141 of the modified vacuum platen 140. The bottom plate 141 is contoured in the form of an upward bow curved in the direction opposite to the downward direction of sag that develops in the intermediate portion of the glass sheet 112 when the latter drops onto the shaping mold 60.

FIG. 16 shows how the contoured bottom plate 141 while occupying a first position adjacent and above the glass sheet initially engages the marginal portion only of the glass sheet 112 while the latter is flat. FIG. 17 shows how the continued application of vacuum sucks the heat-softened glass sheet into a curved configuration that conforms to the configuration of the contoured bottom plate 141 and illustrates the upward bowing effect previously mentioned. The shape of the contoured plate 141 is predetermined to cause the glass sheet to bow upwardly approximately the amount needed to compensate for any unwanted downward sag that accompanies drop forming.

While the glass sheet 112 is being pulled by suction into the upwardly bowed configuration depicted in FIG. 17, the platen 140 moves upward vertically to a second position. The second platen position provides clearance for the outline shaping mold 60 to move into position beneath the modified vacuum platen 140.

When the mold 60 is at its proper position beneath the modified vacuum platen 140, the vacuum applied to the platen 140 through the flexible conduit 45 is stopped and, if desired, air is applied under pressure through the flexible conduit to develop a superatmospheric pressure within the platen 140 to help drop the glass sheet 112 onto the shaping mold 60 as shown in FIG. 18. The glass sheet 112 assumes the shape of the shaping mold 60 around its supported marginal portion.

The downward sag in the intermediate portion of the glass sheet 112 drop-formed on the mold 60 is approximately compensated by its reverse upward bowing during the process step depicted in FIG. 17. Consequently, this last embodiment of the present invention provides an upward bow in the intermediate portion of the glass sheet 112 before the platen 140 releases the glass sheet to drop onto the shaping mold 60. This temporary upward bow is controlled by providing a proper contour for the contoured apertured bottom plate 141 of the vacuum platen 140 having such an upward bow as to compensate for any unwanted downward sag in the glass sheet 112 after the latter is shaped by drop forming onto the mold 60.

Descriptions of specific embodiments have been set forth herein for the sake of illustrating the best mode and other illustrated examples for practicing applicant's invention, but is should be understood that other variations and modifications as are known to those of skill in the art may be resorted to without departing from the spirit and scope of the invention as set forth in the claims which follow.

I claim:

1. A method of shaping a glass sheet, comprising the steps of:
   heating a glass sheet to approximately its softening point;
   positioning a surface of the sheet and surface of a perforated plate into close proximity to each other, the surface of the plate having outer portions and inwardly, upwardly bowed inner portions;
   drawing a vacuum through the perforated plate so as to bring outer marginal edge portions of the sheet against the outer portions of the plate and inner surface portions of the sheet against the inwardly, upwardly bowed inner portions of the plate to upwardly bow the inner surface portions of the sheet;
   supporting the plate and the bowed sheet carried thereon in an essentially horizontal orientation with the bowed sheet under the plate;
   vertically aligning the bowed sheet over a shaping mold, the shaping mold having a contour defining desired contour for the shaped glass sheet; and
   releasing the bowed sheet from the plate so as to fall onto the shaping mold and conform to the contour defined by the shaping mold to shape the sheet.

2. The method as set forth in claim 1 wherein said releasing step is practiced by discontinuing the practice of said drawing step and thereafter moving gas at superatmospheric pressure through the perforated plate to help drop the bowed sheet onto the shaping mold.

3. The method as set forth in claim 1 or claim 2, wherein:
   the bow of the bowed sheet has a magnitude approximately equal to that needed to compensate for unwanted downward sag that develops in the inner surface portions of the bowed sheet when the bowed sheet falls onto the shaping mold.

4. The method as set forth in claim 3 further including the step of applying tempering medium against the surfaces of the shaped glass sheet supported on the shaping mold at a rate sufficient to impart at least a partial temper in the shaped glass sheet.

5. An apparatus for shaping a glass sheet comprising:
   furnace means for heating a glass sheet to a softened condition;
   means for supporting a glass sheet adjacent to said furnace means;
   means for transferring a glass sheet from said furnace means to said support means:
   a platen having an enclosed interior space and a perforated sheet engaging surface having outer portions and inwardly, upwardly bowed inner portions;
   means for transferring said platen into and out of close proximity to said support means so as to lift by way of vacuum, a glass sheet from said support means;
   a shaping mold having upwardly facing shaping surface defining a desired curvature corresponding to the shape of a shaped glass sheet; and
   shuttle means for alternatively bringing said platen and said shaping mold into and out of superimposed vertically spaced relationship to each other, wherein said shaping mold in the superimposed position is supported at an elevation below said perforated sheet engaging surface so as to receive and shape a glass sheet dropped from said platen.

6. The apparatus as set forth in claim 5 further including:
   means for gas evacuating said enclosed interior space of said platen;
   means for gas pressurizing said enclosed interior space of said platen;
   switching means acting on said evacuating means and said pressurizing means to pull a vacuum through said perforated plate to bias a sheet against said plate and to pass gas through said plate to bias a sheet away from said plate.

7. The apparatus as set forth in claim 5 or claim 6 further including means for applying tempering medium onto the surface of a glass sheet supported on said shaping mold.

* * * * *